United States Patent Office 3,268,617
Patented August 23, 1966

3,268,617
ISOMERIZATION OF METHYL-PENTENES USING TUNGSTEN OXIDE CATALYSTS
Henry R. Menapace, Monroe Falls, and Richard R. Smith, Cuyahoga Falls, Ohio, assignors to The Goodyear Tire & Rubber Company, Akron, Ohio, a corporation of Ohio
No Drawing. Filed May 2, 1963, Ser. No. 277,450
11 Claims. (Cl. 260—683.2)

This invention relates to the isomerization of hydrocarbons and particularly to the isomerization of olefins. It relates to catalysts employed to shift the double bonds in olefinic hydrocarbons to a more internally located position and to catalysts which cause carbon skeletal rearrangement of olefinic hydrocarbons. It also relates to a unique process for the isomerization of both normal and branch chain olefins.

In certain uses it is quite often preferred to use olefins which have internal double bonds as opposed to external or terminal double bonds. In other instances it is sometimes desirable to rearrange the carbon atoms of olefins to form various other isomeric forms of olefins. Processes for shifting the double bonds of olefins are known. Also, processes which rearrange the carbon atoms of olefins are known. However, some, if not all, of these prior art isomerization processes produce results and/or side effects which are often undesirable. For instance, some of these prior art processes tend to promote catalytic polymerization and/or catalytic degradation of either the reactant or the product of the isomerization. Some of these prior art processes which will shift double bonds, do not possess the capability to rearrange the carbon atoms of the olefins. Still others produce or promote side reactions of the reactant and/or the product of the isomerization to form unwanted end products and thereby result in low efficiencies and problems in separation and for this reason are uneconomical. Still other of these processes suffer from low conversions. Still others cause unfavorable equilibrium between the reactant and the desired product.

Therefore, it is the object of this invention to provide a process for the catalytic isomerization of both branched and straight chain olefins to form isomers which have their double bond in a more internal position. Another object is to provide a process which will isomerize olefins while maintaining high yields per pass and high ultimate yields. Still other objects are to provide a process which possesses high selectivity of the desired isomeric form of the olefin at high throughput of reactant while at the same time minimizing the undesirable side reactions. Still another object is to provide a process for the carbon skeletal rearrangement of certain olefins. Still another object is to provide a process which simultaneously produces double bond isomerization and at the same time causes carbon skeletal rearrangement. Other objects will appear as the description proceeds.

According to the invention both normal and branch chain olefins can be isomerized by means of a catalyst comprising tungsten oxide on a suitable support. Tungsten oxide ($WO_3$) is the catalyst employed to isomerize olefins in the practice of this invention. It has been found that the best method to employ the tungsten oxide catalyst is to use it on a support. It has been found that such known catalyst supports as crushed fire brick, kieselguhr, alumina, silica, solica-alumina or various other supports are suitable as carriers for the $WO_3$ catalyst of this invention. Of these it is usually preferred to employ alumina ($Al_2O_3$) or the mixture of silcia-alumina ($SiO_2$-$Al_2O_3$). If the silica-alumina support is employed, the $SiO_2$ content should range to not more than about 75% by weight of the support for best results.

The temperatures which may be employed to isomerize olefins in accordance with this invention are conventional isomerization temperatures and can range from a low of 50 to 60° C. to a high of 350–400° C. In this regard, it has been observed that at a temperature range of from about 50° C. to about 200° C. only double bond isomerization is obtained in appreciable amount. However, when temperature of 200° C. is exceeded both double bond isomerization and carbon skeletal rearrangement occurs. This is particularly true when temperatures ranging above 250° C. are employed.

The rate at which the olefins are passed over the catalyst bed in a continuous isomerization process is usually measured in terms of liquid hourly space velocity (LHSV). This term LHSV is defined as the volume of feedstock as a liquid per volume of total catalyst plus support passed over or contacting the catalyst per hour. In the practice of this invention the LHSV may range from a low of about 1 to a high of 20 or 30 or more. However, it has been observed that best results are obtained from about 2 to about 15. In the event that double bond isomerization is desired the LHSV should range between about 7 and about 15 and if carbon skeletal rearrangement is also desired an LHSV of about 2 to about 7 should be employed.

In the preferred embodiment of this invention a vapour phase isomerization with a fixed bed catalyst is employed. Thus, the amount of $WO_3$ employed as catalyst is related to the rate at which the olefin to be isomerized is passed over or through this fixed bed catalyst, i.e. the LHSV. The amount of $WO_3$ catalyst employed in the fixed bed, of course, should be sufficient to cause effective isomerization. In practice, it has been found that an effective amount ranges from about 4% to about 95% by weight of $WO_3$ based on the total weight of the support plus the $WO_3$, i.e. total catalyst weight, whatever it might be. It has been discovered, however, that little advantage is to be gained by employing more than about 10% to 15% $WO_3$ by weight of total weight of the catalyst plus support.

In certain embodiments of this invention nickel oxide (NiO) can also be employed along with the $WO_3$ as an isomerization catalyst. The presence of NiO is not essential but may be employed in amounts ranging from about 1% up to about 10% by weight based on the total weight of the support plus the catalyst (NiO and $WO_3$ both).

As was stated previously, the preferred practice of this invention is in the form of a vapour phase isomerization. This is not to say, however, that liquid phase isomerizations can not be employed. When employing both liquid phase and vapour phase isomerizations with the catalysts of this invention it is usually desirable to employ a catalyst pellet or tablet size which will present sufficient surface area to allow good isomerization rates. The catalyst pellet size has not been found to be critical. In vapour phase isomerizations where the catalyst is in the form of a fixed bed, the pellet size is probably best described by the ratio of the reactor diameter to the pellet diameter. This ratio may vary from extremes such as about 4/1 up to about 12–15/1. Best results are probably obtained at a ratio of about 8/1.

In a fixed bed catalyst, the ratio of the bed length to the bed diameter has not been found to be critical. However, it should be realized that the ratio of bed length to its diameter should be sufficient to prevent channeling of the feed stock and to promote proper contact of the feed stock with the catalyst. A ratio of about 0.18/1 length to diameter has been found about the practical minimum which can be employed. There is no theoretical maximum, however, a practical maximum will probably be about 30 or 40/1 due to excessive pressure buildup in front of or pressure drop across the catalyst bed if a larger ratio is employed.

In the practice of this invention, particularly when a gas or vapour phase isomerization is employed, inert diluents can be used, although they are not essential. If it is desired to employ diluents, such inert diluents as nitrogen, carbon dioxide, the inert gases such as neon, argon, etc. and saturated hydrocarbons boiling within a reasonable boiling range for instance those boiling in the same ranges as the olefins which contain 4 to 20 carbon atoms may be used.

Although it is usually more desirable to employ atmospheric pressure and vapour phase isomerization in the practice of this invention, both subatmospheric, i.e. 50 millimeters of mercury up to superatmospheric, i.e. several hundred atmospheres may be employed. Of course, if a liquid phase isomerization is desirable, it is most likely that superatmospheric pressure must be employed to keep the reactants liquid at the most desirable temperature.

The catalyst employed in the practice of this invention can be regenerated by employing any of the conventional procedures, one of which is steaming at about 350° C. to about 450° C. for relatively short periods of time.

The olefins which may be isomerized by the catalyst of this invention include both normal and branched chain olefins which boil in a reasonable boiling range and include olefins containing from four carbon atoms to those containing about 18 to 20 carbon atoms. Thus, butene-1, pentene-1, hexene-1 and hexene-2 and the like may be converted to olefins containing a more internal double bond such as butene-2, pentene-2, hexene-3 and the like. Representative of simple branched chain olefins are such olefins as 2-methylbutene-1, 2-methylpentene-1, 4-methylpentene-1 and the like which may be converted to 2-methylbutene-2, 2-methylpentene-2, 3-methylpentene-2 and the like. Various other mono substituted olefins containing up to about 20 carbon atoms may also be isomerized in accordance with this invention. Dialkyl substituted olefins representative of which is 2,3-dimethylbutene-1, etc. may also be isomerized as well as trialkyl substituted olefins representative of which is 2,2,3-trimethylpentene-1 may also be employed in the practice of this invention. Olefins containing alkyl substituents with more than one carbon atom are contemplated to be within the scope of this invention. Representative of such olefins are 3-ethylpentene-1, 3-ethylhexene-1 and the like. All of these olefins can be isomerized to produce their isomeric forms which have a more internal double bond or they may be subjected to conditions which promote carbon skeletal rearrangement to form isomers which have different carbon placements as well as different double bond placements. It is believed that those skilled in the art to which this invention is directed will be able to determine the extent and scope of the olefins which may be employed in this invention as well as the specific conditions required to shift either the double bond and/or various carbon atoms of these olefins.

Several particularly interesting embodiments of this invention are the isomerizations of 2-methylpentene-1 to form 2-methylpentene-2; hexene-1 to form hexene-2 and 3- and 4-methylpentene-1 to a mixture of 2-methylpentene-2 and 3-methylpentene-2.

Further practice of this invention is illustrated by reference to the following examples which are intended to be illustrative and in no manner limiting. Unless otherwise noted, all parts and percentages are reported by weight.

The isomerization experiments reported in these examples were performed in a stainless steel reactor of approximately 10 cubic centimeter catalyst volume. The temperature control was provided by enclosing the reactor in an electric furnace. The feed stock was fed to the reactor by means of pressure. The reactor was equipped with the necessary flow meters, control valves, preheaters, temperature indicating devices and the like. The catalyst bed was 5½" long and ½" in diameter. The catalyst size was approximately 1/16" granule. The isomerizate was cooled and colled in sample containers and subsequently analyzed by conventional gas chromatographic analysis techniques.

*Example I*

In this isomerization 2-methylpentene-1 was isomerized over a catalyst having an average bulk density of 64 pounds per cubic foot, a surface area of 184 square meters per gram. This catalyst had been prepared by impregnating alumina with 10% tungsten oxide and 4% nickel oxide. These percentages are on the basis of the weight of total catalyst plus support. The reaction conditions were 150° C., an LHSV of 10 and atmospheric pressure. The reaction was run continuously for 50 hours. This experiment resulted in a conversion of 76% of the 2-methylpentene-1 to a product containing 97% 2-methylpentene-2.

*Example II*

In this experiment 2-methylpentene-1 was passed over a catalyst which had a bulk density of 63 pounds per cubic foot and a surface area of 145 square meters per gram. It had been prepared by the addition of 10% by weight of the total catalyst plus support of tungsten oxide impregnated on alumina. The reaction conditions were approximately 100° C., an LHSV of 10 and atmospheric pressure. This experiment was run continuously for 50 hours. This experiment resulted in a conversion of 79% of the 2-methylpentene-1 to a product containing 96% 2-methylpentene-2.

*Example III*

In this example, hexene-1 was passed over a catalyst comprising 10% by weight of total catalyst plus support of tungsten oxide on alumina at 300° C.; an LHSV of 5 and atmospheric pressure. This experiment resulted in approximately 92% conversion of the hexene-1 to a product having the following analysis: 73% internal normal hexenes (hexene-2 and hexene-3); 11% 3-methyl-2-pentene; about 7% 2-methyl-2-pentene; about 3% 4-methyl-2-pentene and about 6% other hydrocarbons.

*Example IV*

In this example 4-methyl-1-pentene was isomerized over a catalyst comprising 10% tungsten oxide and 4% nickel oxide supported on alumina. The percentages are based on weight of total weight of catalyst plus support. The reaction conditions were approximately 325° C., atmospheric pressure and an LHSV of 2. This resulted in 92% of the 4-methylpentene-1 being isomerized to a product containing about 30% 3-methylpentene-2; 30% 2-methylpentene-2; about 15% 2-methylpentene-1, about 20% 4-methylpentene-2 and about 5% other hydrocarbons.

These examples illustrate that the catalyst of this invention isomerize terminal olefins to olefins containing double bonds in a more internally located position. They also illustrate the carbon skeletal rearrangement of olefins simultaneously with double bond isomerization at different conditions. Other similar results may be obtained by employing the catalyst of this invention with other olefins containing from 4 to 20 carbon atoms at conditions taught elsewhere in this specification.

While certain representative embodiments and details have been shown for the purpose of illustrating the invention, it will be apparent to those skilled in this art that various changes and modifications may be made therein without departing from the spirit or scope of the invention.

What is claimed is:

1. A method which comprises contacting a catalyst comprising tungsten oxide on a suitable support with a terminal olefin selected from the group of 2-methyl pentene-1 and 4-methyl pentene-1 at substantially atmospheric pressures and in the substantial absence of water at temperatures varying from about 50° C. to about 400° C. to cause isomerization of said terminal olefin.

2. A method of producing 2-methyl pentene-2 from 2-methyl pentene-1 which comprises contacting a catalyst comprising tungsten oxide on a suitable support with 2-methyl pentene-1 at temperatures ranging from about 50° C. to about 200° C. at substantially atmospheric pressures and in the substantial absence of water, to shift the double bond in said 2-methyl pentene-1 to a more internally located position thereby forming 2-methyl pentene-2.

3. A method according to claim 2 in which the amount of tungsten oxide varies from about 4 percent to about 10 percent by weight of the catalyst plus the support.

4. A method according to claim 2 in which the LSHV ranges between about 7 and about 15.

5. A method according to claim 2 in which nickel oxide (NiO) is employed as a co-catalyst.

6. A method according to claim 5 in which the weight of tungsten oxide varies from about 4 percent to about 10 percent by weight of the catalyst plus the support and the nickel oxide varies from about 1 percent to about 10 percent by weight of the weight of the catalyst plus the support.

7. A method of producing 3-methyl pentene-2 and 2-methyl pentene-2 from 4-methyl pentene-1 which comprises contacting a catalyst comprising tungsten oxide on a suitable support with 4-methyl pentene-1 at temperatures above 200° C. at substantially atmospheric pressures and in the substantial absence of water to cause both a double bond migration and a carbon skeletal rearrangement thereby forming 3-methyl pentene-2 and 2-methyl pentene-2.

8. A method according to claim 7 in which the amount of tungsten oxide varies from about 4 percent to about 10 percent by weight of the catalyst plus the support.

9. A method according to claim 7 in which the LSHV ranges between about 2 and about 7.

10. A method according to claim 7 in which nickel oxide (NiO) is employed as a co-catalyst.

11. A method according to claim 10 in which the weight of tungsten oxide varies from about 4 percent to about 10 percent by weight of the catalyst plus the support and the nickel oxide varies from about 1 percent to about 10 percent by weight of the weight of the catalyst plus the support.

References Cited by the Examiner

UNITED STATES PATENTS

| | | | |
|---|---|---|---|
| 1,988,112 | 1/1935 | Egloff | 260—683.15 |
| 2,536,768 | 1/1951 | Reynolds et al. | 252—467 |
| 2,608,534 | 8/1952 | Fleck | 260—683.2 |
| 2,982,799 | 5/1961 | Klinkenberg | 260—683.2 |
| 3,182,048 | 5/1965 | Mills | 260—93.7 |
| 3,184,404 | 5/1965 | Flinn et al. | 252—470 |
| 3,198,752 | 8/1965 | Bridger et al. | 252—467 |

DELBERT E. GANTZ, *Primary Examiner.*

R. H. SHUBERT, *Assistant Examiner.*